United States Patent [19]
Asprey et al.

[11] Patent Number: 5,353,409
[45] Date of Patent: Oct. 4, 1994

[54] COMPUTER-MONITOR EXTENDED RANGE COMMUNICATIONS LINK

[75] Inventors: Robert R. Asprey, Harvest; Remigius G. Shatas, Huntsville, both of Ala.

[73] Assignee: Cybex Corporation, Huntsville, Ala.

[21] Appl. No.: 555,580

[22] Filed: Jul. 19, 1990

Related U.S. Application Data

[63] Continuation-in-part of Ser. No. 447,010, Dec. 5, 1989, which is a continuation-in-part of Ser. No. 95,140, Sep. 11, 1987, Pat. No. 4,885,718.

[51] Int. Cl.$^5$ .............................................. G06F 15/02
[52] U.S. Cl. .................. 395/275; 364/935.2; 375/36
[58] Field of Search ...................... 395/275; 364/927.2, 364/935.2, 935.5; 340/701, 703; 375/36

[56] References Cited

U.S. PATENT DOCUMENTS

| | | | |
|---|---|---|---|
| 4,622,551 | 11/1986 | Kupersmith et al. | 375/36 |
| 4,885,718 | 12/1989 | Asprey et al. | 364/927.2 |
| 5,058,131 | 10/1991 | Thacker | 375/36 |
| 5,089,886 | 2/1992 | Grandmougin | 375/36 |

Primary Examiner—Dale M. Shaw
Assistant Examiner—Moustafa M. Meky
Attorney, Agent, or Firm—Phillips & Beumer

[57] ABSTRACT

This invention relates to circuitry for extending TTL signals from a computer to a remotely located monitor and keyboard and which uses a first signal conditioning circuit proximate the computer to generally reduce amplitude of the video signals and bias them to a selected potential, after which the signals are applied to discrete conductors of an extended cable. The cable, in three embodiments described herein, may be up to 250 feet, 400 feet, or 1,000 feet. A second signal conditioning circuit at the monitor and keyboard end of the cable receives the attenuated signals and utilizes a threshold or pair of thresholds to effect reconstruction of the video signals prior to inputting them to the monitor. Significantly, amplitude reduction or attenuation of the video signals generally reduces high frequency video noise appearing on the keyboard clock conductor of the cable, preventing keyboard errors. Additionally, line capacitance and inductance in conductors of the extended cables is utilized to further attenuate the video signals.

26 Claims, 6 Drawing Sheets

COMPUTER-MONITOR EXTENDED RANGE COMMUNICATIONS LINK

CROSS-REFERENCE TO RELATED APPLICATION

This application is a continuation-in-part of application Ser. No. 07/446,010, filed on Dec. 5, 1989, which is a continuation-in-part of application Ser. No. 07/095,140, filed on Sept. 11, 1987, now U.S. Pat. No. 4,885,718.

FIELD OF THE INVENTION

This invention relates to an extended length, TTL driven coupling system for coupling video and keyboard signals between a computer and monitor and keyboard with a single, conventional cable up to 250 feet in one embodiment, up to 400 feet in a second embodiment, and up to 1,000 feet in yet a third embodiment of the present invention.

BACKGROUND OF THE INVENTION

It is a convenient practice to physically separate a digital computer from the keyboard and monitor by which the computer is monitored and controlled. The monitor and keyboard may be in the form of a single housed unit or, as is more common today, the monitor and keyboard are separate. One of the most popular microcomputers in use today is the IBM personal computer family and its clones made by others, which generally utilize the same or a similar arrangement for interconnecting a keyboard and monitor to the computer.

As a matter of convenience, there are separate electrical connectors on these computers for mating plugs, one plug connecting to a monitor cable and the other to a keyboard cable. The opposite ends of these cables are provided with plugs which plug into a monitor connector of a monitor and a keyboard connector of a keyboard. Normally, these cables are on the order of three to six feet, enabling some, but limited, separation from the computer. This typically requires that the computer and work station be located together.

It is to be appreciated that there are situations, in fact, many, where it is desirable to separate the computer from the work station. This may be due to space considerations or an inhospitable environment for a computer.

Separation has been attempted by extending the length of the separate connecting cables described above, but it has been found that where separation is generally greater than 12–18 feet, reliability of keyboard operation and quality of the video display is sacrificed. If a single cable housing conductors conveying both video and keyboard signals is attempted, as would be the ideal approach, signal interaction becomes intolerable due to induced crosstalk between keyboard and video signal conductors. Although it is believed others have attempted to solve these problems, which have been present for years, applicants are unaware of any successful single-ended driven TTL cable system has been accomplished other than by applicants.

Applicants have devised trouble-free, single ended, TTL driven computer/monitor extension systems which have been proven to extend digital color and monochrome video and keyboard communications between a computer and keyboard and monitor up to 150 feet. These systems are subject of U.S. Pat. No. 4,885,718, issued Dec. 5, 1989, to applicants, which is a parent case of co-pending application Set. Nos. 07/447,010, filed Dec. 5, 1989, and 07/488,710, filed Mar. 10, 1990. Of these, it is believed that application Ser. No. 07/447,010 is the closest to one embodiment of the present invention. However, in all of these systems of the prior art, even with special shielding techniques, when it was attempted to extend digital color video and keyboard communications past approximately 175 feet, signal interaction again became intolerable.

Application Ser. No. 07/447,010 utilizes TTL Schmitt-triggered amplifiers in a first signal conditioning circuit to amplify video signals from a computer and provides these amplified signals via a series resistor to an extension cable. At the other end of the cable, Schmitt-triggered TTL amplifiers amplify the degraded video signals prior to inputting them to a monitor. Significantly, this circuit is limited to reliable extended TTL transmissions of color video signals up to approximately 150 feet because of signal degradation. Applicants extend this range to a maximum of approximately 300 feet by using monochrome monitors.

In application Ser. No. 07/488,710, analog video communications are extended to approximately 300 feet by utilizing a discrete current amplifier near the computer for the R, G, and B analog video signals to modulate signal current flow through the 300-foot cable. A second current amplifier proximate the monitor boosts the signal prior to inputting them to the monitor. Significantly, the horizontal sync pulse, in an analog situation, was prone to cause the interfering crosstalk. Accordingly, to reduce this crosstalk, the HS signal was converted to a limited-amplitude signal which is further attenuated by the 300-foot cable in order to reduce noise.

Accordingly, it is the object of the present invention to provide TTL driven, sing/e-ended extension communications systems among a computer, monitor, and keyboard which allow extensions of up to 250 feet, 400 feet, and 1,000 feet for the embodiments described herein.

SUMMARY OF THE INVENTION

In accordance with this invention, video signals, primary R, G, and B, and secondary r, g, and b are provided by a computer to a first signal conditioning circuit which, in two embodiments of this invention, shapes the primary and secondary signals to compensate for distortion induced by conductors of the cable. Additionally, these signals are reduced in amplitude to reduce signal interaction. These reduced signals are applied to conductors of an extension cable and received at a second signal conditioning circuit where they are restored to TTL levels by TTL reconstruction circuits. Thereafter, the signals are provided to a monitor.

DETAILED DESCRIPTION OF THE DRAWINGS

Figure 1:
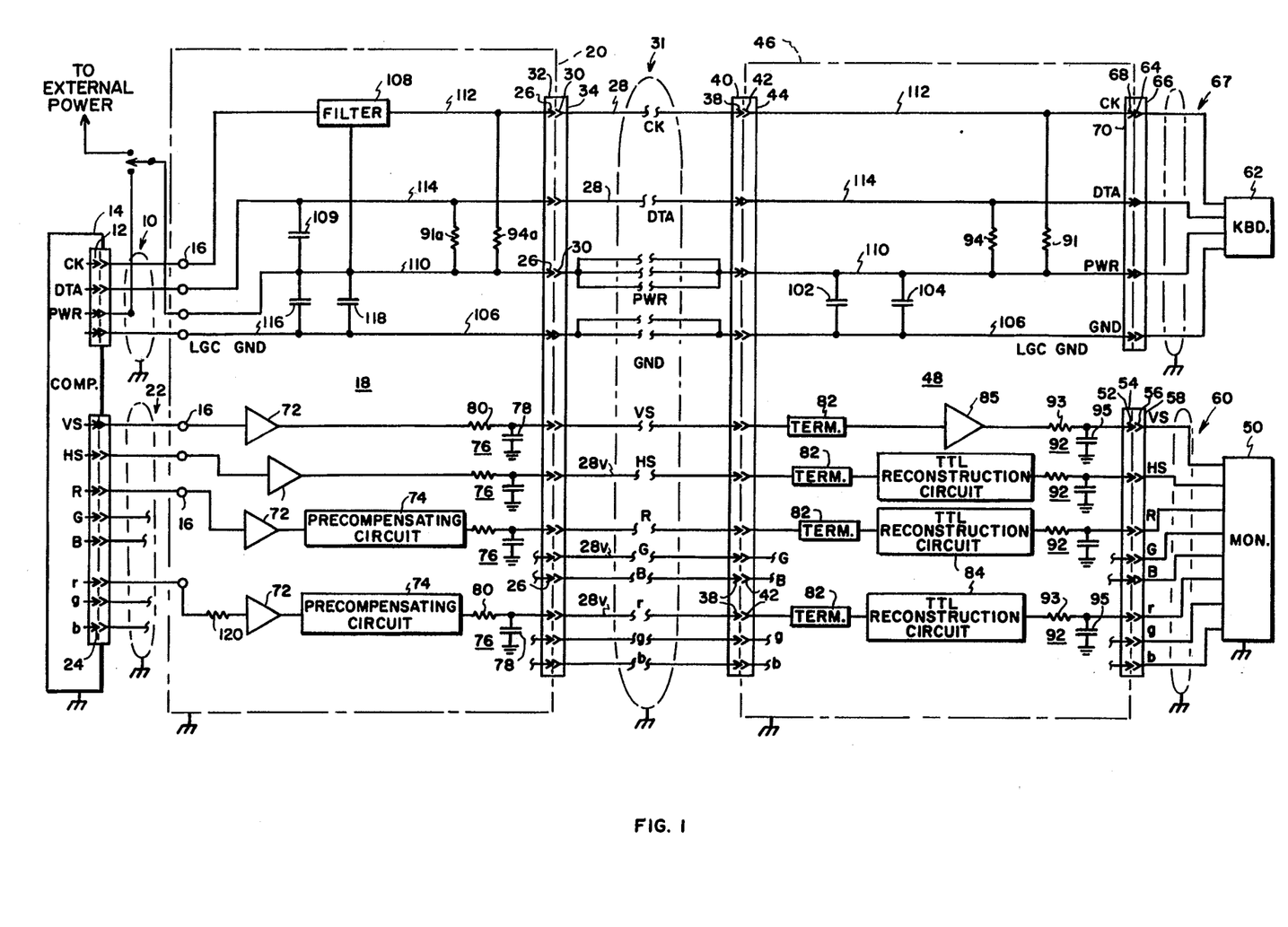
FIG. 1 generally illustrates a partially schematic, partially block diagram common to the embodiments described herein.

Discussion of the present invention will begin with FIG. 1, a block diagram common to all the contemplated embodiments disclosed herein, and initially describing circuit connections. A shielded cable 10 for conveying keyboard signals is connected from keyboard input connector terminals 12 of computer 14 to solder connections, or pads, 16 coupled to a signal conditioning circuitry 18 housed in an enclosure 20. Alternately, signal conditioning circuitry 18 may be incorporated in the circuitry of computer 14 or be on a separate circuit board mounted In the same enclosure with computer 14. As functionally labeled, keyboard connections to signal conditioning circuitry 18 are clock (CK), data (DTA), power (PWR), including +5 V., and logic ground (LGC GND). In general, the keyboard power and logic ground potentials are used to absorb high frequency noise, as will be described, and further provide power and logic ground potentials (not shown) to the logic elements of the circuitry of the present invention. Additionally, in instances where the keyboard power is current limited, external power is provided to the signal conditioning circuitry via a single pole switch 19 coupled as shown to an external power source. While +5 V. used and illustrated herein, some computer systems use other keyboard potentials, such as +12 V. (not shown). In this instance, values of components of the present invention would be selected accordingly.

The clock signal Is of a pulse rate generally in the range of between 1 kHz and 100 kHz, and the data signal possesses a frequency less than or equal to the pulse rate. Also, the keyboard signals, in some computer systems, are hi-directional signals, as with systems wherein certain keyboard functions are controlled by software and with systems wherein data is loaded into a keyboard memory upon initialization. However, in all instances, the keyboard provides data input to computer 14.

As described for the keyboard connections, pads 16 provide video connections from a shielded cable 22 coupled to computer 14 via video output terminals 24 of computer 14 to signal conditioning circuitry 18. These video signals include vertical sync signals (VS), horizontal sync signals (HS), and primary and secondary color video signal which include primary Red, Green, and Blue, designated by upper case R, G, and B, and secondary red, green, and blue, designated by lower case r, g and b, and chassis ground, conventionally shown. These color video signals are present in at least two commonly used color monitor systems, the color graphics adapter (CGA) and enhanced graphics adapter (EGA) systems. In the CGA system, the primary R, G, and B signal lines carry color video information, with the secondary g line carrying an intensity signal. Typically in this system, the primary R, G, and B lines carry varying, independently discrete color signals, while the intensity signal on the g line fluctuates between high and low states and acts upon color guns switched on to vary their intensity simultaneously, making possible 16 different colors.

In the EGA system, on the other hand, and in addition to the primary R, G, and B signals, secondary r and b signals are provided in addition to the g signal, all of which may be varied independently from one another and additionally may be turned on independent from the primary R, G, and B signals, making possible 64 different colors.

Video and sync signal outputs VS and HS, primary R, G, and B, and secondary r, g, and b from computer 14 (FIG. 1) are also conditioned in signal conditioning circuit 18, as will be described, and output from enclosure 20 via plug terminals 26 coupled to receptacle terminals 30, in turn connected to discrete conductors 28 of an extended-in-length cable 31. Plug terminals 26 and receptacle terminals 30 are mounted in a plug terminal assembly 32 and a receptacle assembly 34, with plug assembly 32 supported by enclosure 20, and receptacle assembly 34 supported by one end of cable 31. Likewise, keyboard signals CK and DTA, which, as stated, may be hi-directional signals between the keyboard and computer 14, are coupled by plug terminals 26 in plug assembly 32 to receptacle terminals 30 in receptacle assembly 34. Logic ground, generally a filtered ground potential, is also coupled through this receptacle. Chassis ground conventionally links components of the system together at a chassis ground potential.

Cable 31 is a conventional cable having a plurality of conductors 28 which convey the described signals up to 250 feet in one embodiment, 400 feet in another embodiment, and up to 1,000 feet in yet a third embodiment from computer 14 to a keyboard and display unit (KDU). Conductors 28 are each insulated with an insulative cover such as foamed polyethylene or an equivalent, possess a conductor-to-conductor capacitance of between 12–16 pf/foot, and maintain their relative positions in the bundle of conductors over the length of cable 31. Braided and foil shields 36 (FIG. 2) protect conductors 28 from outside electromagnetic interference and further prevent digital interference from radiating from cable 31, and a protective cover 37 protects the bundle of conductors. This type cable is lees expensive, more compact, and more convenient to use than twisted pair or coaxial cable used by others in attempting to invent a viable KDU extension system and is available from the Belden Corporation located in Richmond, Ind.

At an opposite end of cable 31, the described signals are coupled from conductors 28 via functionally labeled plug terminals 38 mounted in a plug assembly 40 supported by cable to receptacle terminals 42 mounted in a receptacle assembly 44 supported by a second enclosure 46. Enclosure 46 houses a second signal conditioning circuitry 48, which is connected to the described signals by receptacle terminals 42. After being conditioned by signal conditioning circuitry 48, the video signals are output to a monitor 50 via plug terminals 52 in plug assembly 54 supported by cable 60 and coupled to receptacle terminals 56 mounted in a receptacle assembly 58 supported by a monitor cable 60. Generally, monitor cable 60 is directly connected to the circuitry of monitor 50. Likewise, keyboard is coupled to signal conditioning circuitry 48 via receptacle terminals 64 in a receptacle assembly 66 supported by a keyboard cable 67, with receptacle terminals 64 coupled to plug terminals 68 connected to signal conditioning circuitry 48 and mounted in a plug assembly 70 supported by enclosure 46. As with signal conditioning circuitry 18, signal conditioning circuitry 48 may be housed in either monitor 50 or keyboard 62, incorporated in the circuitry thereof, or be placed on a separate circuit board and mounted in a KDU unit, monitor 50, or keyboard 62. Of course, the plug assemblies and receptacle assemblies may be mounted either on the ends of the extension cable or on the enclosures, depending on design requirements.

In general, and referring to FIG. 1, the video signals and VS, primary R, G, and B, and secondary r, g, and b (with only the primary R and secondary r signal paths being shown, they being identical to the primary G and B and secondary g and b signal paths in the block diagram of FIG. 1) are first amplified by TTL buffer amplifiers 72. It is emphasized that buffer amplifiers 72 are not necessary in many computer systems compatible with applicants' system, and wherein a like amplifier which outputs TTL level signals is incorporated in the video driver card of the computer; however, if a particular type of computer uses a different output driver in the video card thereof, this driver may not be able to drive signal conditioning circuits of this invention. Hence, applicants utilize buffer amplifiers 72 as a matter of convenience in order to assure compatibility of their system with virtually all makes and models of computers in use today. Buffer amplifiers 72 accept varying quality signals from these various types of computers and serve to make these signals compatible with applicants' TTL transmission scheme and further clean up the signals and convert them to TTL voltage levels if they are not initially at TTL levels. Further, the signals are coupled to amplifiers 72 in a single-ended configuration, meaning that only one output wire or conductor is needed to transmit the red video signal from amplifiers 72. After being converted to TTL levels, the video signals primary R, G, and B and secondary r, g, and b are passed to a precompensating circuit 74, which varies for the three embodiments to be described hereinafter but which generally function to reduce the voltage swing of the TTL output of buffer amplifiers 72 from 0.4 V. to 3.5 V. to a significantly smaller voltage ewing ranging between 0.5 V. to 1.7 V., depending on the embodiment. Further, precompensating circuits 74, in two embodiments, bias or adjust the center voltage of the reduced-amplitude signal to a selected potential, for reasons to be explained. Significantly, precompensating circuits 74 reduce signal current flow in conductors of cable 31 by applying a smaller signal with corresponding less energy thereto, causing radiated video noise which tends to be induced onto the keyboard clock line, which video noise being responsible for keyboard errors by causing false clock pulses, to be kept to a minimum. This method is contrasted with the methods of prior art which generally utilize differentially driven twisted pairs per discrete signal or a separate coaxial shielded cable per signal and which are concerned with applying a stronger, larger voltage signal to a conductor as the length of the conductor increases. Conversely, in applicants' system, the longer the cable, the smaller the signal voltage applied thereto by precompensating circuits 74. This smaller signal radiates far less noise than a conventional TTL signal applied to a single conductor.

No precompensation is necessary with respect to the HS and VS video signals because they are much slower signals, being in the kHz range or slower, as opposed to the primary and secondary color signals, which can be as high as 30 mHz in a worst case situation.

Next, the video signals are passed to a roll-off filter circuit 76 which reduces radiated EMI pursuant to electromagnetic noise regulations set forth by the Federal Communications Commission and which is common to all embodiments described herein, which circuit is a conventionally configured RC network consisting of a capacitor 78 and a resistor 80 in the range of 20 ohms for the primary and secondary signals. However, applicants increase the value of capacitors 78 from the standard value of 47 pF, typical for such noise filters used by others, by approximately tenfold, to 470 pF. This increases attenuation of the high frequency components of the video signals, or the particularly fast TTL rise and fall times, which are significantly higher than the dot-clock frequency, or pixel rate, of the monitor, this dot-clock frequency being from 10-30 mHz, depending on the monitor. This attenuation of the high frequency components reduces radiated video noise to adjacent conductors of cable 31. It is noted that precompensating circuit 74 and roll-off filter 76 cooperate to distort the video signals opposite or opposed to the distortion caused by cable 31 such that the distortions tend to cancel each other, resulting in relatively intact video signals being received by signal conditioning circuitry 48 and an almost flat frequency response over the length of cable 31, heretofore unachieved by others. Of course, amplitude of the received signals is further reduced or attenuated by the aforementioned line capacitance of cable 31, this attenuation being additive with attenuation from precompensating circuits 74 and roll-off filters 76. After passing roll-off filters 76, the video signals are applied to discrete conductors 28 of cable 31.

At an opposite end of cable 31, video signals VS and HS, primary R, G, and B, and secondary r, g, and b are terminated by a termination circuit 82, the configuration of which varies between embodiments disclosed herein and, with exception of the vertical sync pulse signal (VS), are thereafter passed to reconstruction circuits 84. As stated, the VS signal is so slow (approximately 60 Hz) that only minimal conditioning is necessary. In this case, the VS signal is applied to a buffer amplifier 85, which generally cleans up the signal and ensures that it is at a TTL level. In two of the embodiments of these circuits, a deadband, or hysteresis range 86 (FIG. 6) is provided, having upper and lower thresholds 88 and 90, respectively. The third embodiment utilizes a single, center threshold 91, as will be described. Significant to operation of applicants' circuitry, the video signals attenuated and biased as described by signal conditioning circuitry 18 possess a center voltage close to the center of hysteresis band 86 of reconstruction circuits 84 and have amplitudes in positive and negative directions just sufficient to cross either of thresholds 88 and 90 and generate TTL outputs from circuits 84.

Deadband or hysteresis region 86 may range from 400-700 mV., depending on the type device used, and has an upper voltage threshold 88 such that an input signal crossing threshold 88 in a positive-going direction causes a switch in the output to a high logic state, or about 3.5 V., while an input signal crossing the lower threshold 90 in a negative-going direction causes a switch in the output to a low logic state, or about 0.5 V. or less. After the input signal crosses either of thresholds 88 or 90 in the requisite direction, triggering the switch responsive thereto to the respective logic state, the output is set at that logic state until the signal crosses the opposite threshold. Thus, all that is necessary to trigger reconstruction circuits 84 is for the input signal to cross one of thresholds 88 or 90 for a very brief instant, after which the input signal may fall or rise into hysteresis region 86, crossing the same threshold in an opposite direction without affecting the output. These circuits provide a reconstructed or reshaped TTL video signal having an amplitude of from 0.5 V. to 3.5 V. which is suitable for inputting to monitor 50. As monitor 50 is generally, but not necessarily, a TTL or digital monitor, each instance of the video signal crossing a threshold and triggering an output responsive thereto from one of amplifiers 84 represents one or more pixels in the display of monitor 50 being turned on or off.

After being amplified as described, the video signals are passed to a roll-off filter 92 identical to filter 76 of conditioning circuit 18 and used for the same purpose, i.e., attenuation of the high frequency components to effect a reduction of noise radiation from monitor cable 60. It is to be noted here that this filter network may be replaced by a choke or a ferrite bead, or equivalent thereof, placed in or around the signal line.

Keyboard signals, in all embodiments described herein, and which generally originate in keyboard 62 but, as stated, may be bi-directional in some instances, are minimally conditioned in signal conditioning circuitry 48. However, it has been found that pull-up resistors 91 and 94, coupled as shown between data lane 114, clock line 112, and power line 110, are, in most instances, necessary to overcome capacitance and inductance of the conductors of cable 31. Values of these resistors, in general, are from approximately 250–4,000 ohms, with shorter cable lengths requiring a higher value of resistance for resistors 91 and 94, alternately, resistors 91 and 94 may be placed in signal conditioning circuitry 18, as shown by resistors 91a and 94a. Also, a pair: of capacitors 102 and 104, capacitor 102 being relatively large, approximately 22 mFd, and capacitor 104 being relatively small, approximately 0.1 mFd, are coupled between power lead 110 and logic ground lead 106 and serve to filter low and high frequency noise from the +5 V. supply.

In signal conditioning circuitry 18, where keyboard signals are received from conductors of the cable, the significant technique is that of utilizing a filter 108 which functions generally to shunt any high frequency noise of a significantly higher frequency than the clock pulse, this noise being approximately 350 kHz and up, and generally originating from adjacent video conductors of extended length cable 31 and appearing on clock line 112. Any other high frequency noise in the range of from approximately 350 kHz and up is also prevented from reaching computer 14 by filter 108. In some instances, a high frequency series impedance in clock line 112 is also used. It is to be noted that the +5 V. supply was chosen to receive this noise because, in general, the +5 V. line is a more stable potential than ground potential, with the external power supply or keyboard power lead that provides the +5 V. being able to absorb the high frequency noise more readily than the filters to ground. However, with proper filtering of either logic ground or chassis ground, the noise signal on clock line 112 could be shunted to one of these ground potentials instead of +5 V. Additionally, in systems using different keyboard potentials, such as 12 V., or in systems utilizing asynchronous keyboard communications, the noise may be shunted to these different potentials or a stable ground potential. The important factor here is that applicants shunt the high frequency noise signals to a stabilized potential or voltage level such as the aforementioned +5 V. supply or an adequately filtered ground potential. In addition to filter 108, a pair of capacitors 116 and 118, having values of 22 mFd and 0.1 mFd, respectively, are coupled between +5 V. and ground and, as stated, serve to filter low and high frequency notes from +5 V. line 110. Further, a capacitor 109 is coupled between +5 V. line 110 and data line 114 and also functions to shunt noise of a significantly higher frequency than the data signal to +5 V. line 110.

Figure 2:
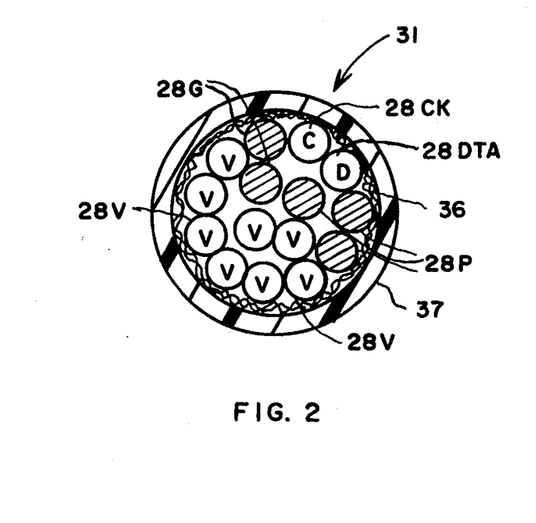
FIG. 2 illustrates a particular manner by which various signals are applied to discrete conductors of the extension cable to effect shielding between video signals and clock signals.

Yet another technique for reducing video noise on clock line 114, and which involves a specific manner or pattern by which various signals are applied to discrete conductors of the extended cable 31, is Illustrated in FIG. 2. Applicants have discovered that by applying keyboard clock and data signals to adjacent conductors 28 CK and 28 DTA (C & D) and then applying keyboard +5 V. power and ground potentials as shown to interposing, shaded conductors 28p and 28g, the interposed conductors 28p and 28g effects shielding between keyboard clock and data conductors 28 CK and 28 DTA from radiation emanating from color video signals applied to conductors 28v. This technique does not block all Interference, but it is estimated that substantially more than half of the video interference is blocked.

Turning now to specific details of construction of the embodiments of the present invention, and with construction details such as cable plug and receptacle connections shown in the block diagram of FIG. 1 not shown in this or following embodiments, their presence being understood, and with like electrical components bearing like designations in the following drawings and descriptions, the first embodiment examined is a computer/KDU extension system capable of TTL transmissions up to 250 feet.

Figure 3:
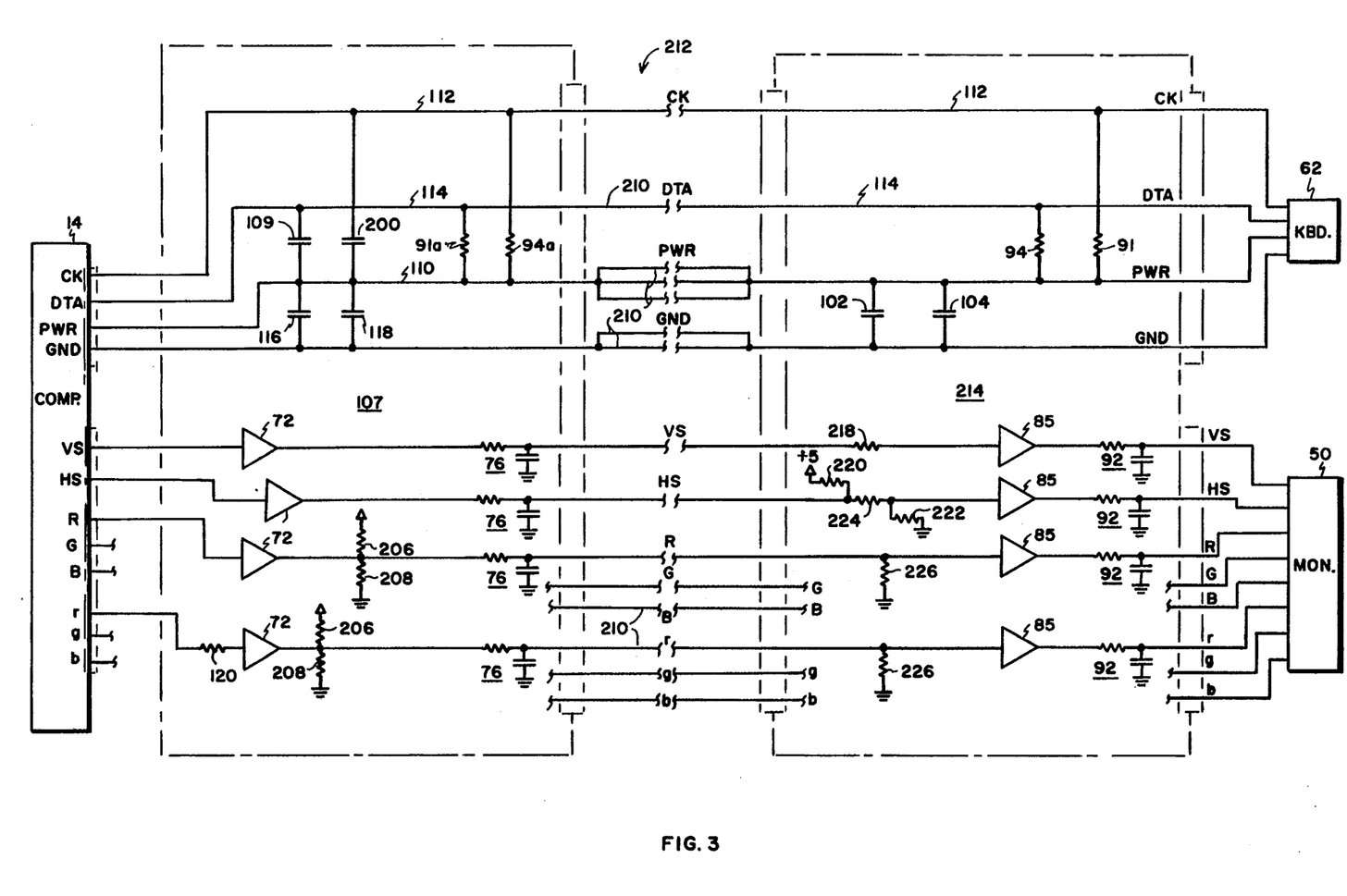
FIG. 3 is a schematic diagram of an embodiment of the present invention capable of extensions of up to 250 feet.

Referring to FIG. 3, and examining the keyboard signal flow first, it is seen that filter 108 in signal conditioning circuit 18 of the block diagram of FIG. 1 is simply a capacitor 200 coupled between clock line 112 and +5 V. Capacitor 200 functions to shunt the high frequency noise which is of significantly higher frequency (350 kHz and up) than the clock pulse to +5 V. line 110. All other components for the keyboard circuit in signal conditioning circuits 107 and 214 are as shown and described for the block diagram of FIG. 1.

Examining the video signal flow of FIG. 3, it is seen that the VS and MS signals and the primary and secondary video signals are input to TTL amplifiers 72 in signal conditioning circuit 107, as shown and described for FIG. 1. As shown, a series resistor 120 having a value of approximately 100 ohms is provided on inputs to amplifiers 72 for the secondary signals r, g, and b, which resistors limit degradation of the secondary signals by shifting their phase slightly from the primary signals, reducing power supply requirements. After being amplified, the primary and secondary signals are output to the preconditioning circuit, which, in this embodiment, comprises a resistor 206 of approximately 680 ohms coupled to +5 V. and a resistor 208 of approximately 360 ohms coupled to ground. These resistors provide line damping and impedance matching to match signal impedance to conductors 210 of cable 212. These precompensating networks are not used on the VS and HS signal lines for reasons previously described. Next, all video signals are passed to the RC networks 76, also used for reasons described, after which the video signals are applied to discrete conductors 210 of cable up to 250 feet in length.

In signal conditioning network 214, the video signals and HS and VS signals are received from conductors 210 and applied to termination network. This termination network, for VS signals, consists of a single series resistor 218 of about 1K ohms, which limits current flow to the following TTL amplifier 85. For the HS signal, a pull-up resistor 220 of about 1K ohms and a pull-down resistor 222 of about 1K ohms are positioned as shown on either side of an approximately 510 ohm series resistor 224. Pull-up resistor 220 provides some current flow to the HS signal line and increases rise time of the signals which have become degraded by the conductor of cable 212. Pull-down resistor 222 o performs a similar function by increasing downward swing of the signals and provides a slight current drain to reduce noise. Series resistor 224 and pull-down parallel resistor 222 also reduce amplitude of the signals applied to amplifier 85.

The primary video signals R, G, and B and secondary signals r, g, and b are each terminated by damping resistors 226 coupled between the respective signal line and ground, with the values of resistors 226 being approximately 200 ohms for the primary signals and about 360 ohms for the secondary signals. These resistors provide a slight current drain, which reduces signal noise, the higher value of resistors used for the secondary signals because generally they are weaker signals.

Next, the HS and VS, primary, and secondary signals are applied to inputs of amplifiers 85, which are TTL, Schmitt-triggered amplifiers having the hysteresis band 86 as described for FIG. 1, and further having voltage levels 87 and 89 at 2 V. and 1 V., respectively (FIG. 6), at which a signal crossing these levels is guaranteed to trigger the amplifier in accordance with TTL conventions. In effect then, the video signals arriving at amplifiers 85, having been degraded by the conductors 210 of cable 212 at the rate of about 12 pF/foot, or about 3,000 pF for the length of 250 foot cable 212, and further having been attenuated and biased as necessary by the preconditioning networks and roll-off filters 76, has a total amplitude of about 1.5 volts and is biased in the center of, or between, points 87 and 89. This means the video signal has a total amplitude of about 0.25 V. greater than the voltage width of the region between points 87 and 89, about 1.5 V. greater than the width of hysteresis region 86. However, the video signals are generally restored to their original voltage swing of approximately 3.0 V. and provided with the characteristic TTL rise and fall times at outputs of amplifiers 85, this occurring as the degraded and attenuated video signals cross thresholds 88 and 90 from the center 91 of hysteresis region 86, triggering amplifiers 85 to generate a TTL level, reconstructed video signal. After being reconstructed, the video signals are applied to an RC network 92 as described for FIG. 1 to prevent radiating noise from the conductors of monitor cable 60.

In the next embodiment of this invention, which will now be described, modifications are made to the circuit of FIG. 1 to allow transmission of TTL signals up to 400 feet from the computer. In this embodiment, and initially examining the keyboard circuit (FIG. 4), it is seen that in addition to capacitor 200 of FIG. 3, which functions to shunt high frequency noise on the clock line to +5 V. line 110, a series inductor 300 is added to clock line 112. Inductor 300 may be a choke-type inductor of between 20-100 microhenries, or it may be an equivalently sized ferrite bead. Inductor 300 functions as a low-pass filter, while capacitor 200 functions as a high-pass shunt. These components prevent superimposed video noise on clock line 112 from reaching computer 14, this video noise being in the above stated range, while passing the 10 kHz clock signal. The indicated values of inductor 300 and capacitor 200 are selected such that they present, to the lowest anticipated frequency of video noise, an attenuation factor of at least 80 percent. For example, a 3 mHz noise signal on clock line 112, which noise signal generally originates in cable 302, presented with a low impedance via capacitor 200, approximately 20 ohms, to +5 V. line 110, and an impedance of approximately 735 ohms to computer 14 via inductor 300, causing most of the 3 mHz signal to be shunted to +5 V. line 110. Likewise, a noise signal of approximately 10 mHz appearing on clock line 112 is presented with approximately 6 ohms impedance to +5 V. via capacitor 200 and approximately 2.5K ohms to computer 14 through inductor 300, again shorting the noise to +5 V. line 110. In contrast, the clock pulse and first few harmonics thereof, being of approximately 10 kHz, a much slower signal, is presented with approximately 6K ohms to +5 V. via capacitor 200 and 8 ohms to computer 14 via inductor 300. Additionally, pull-up resistors 91a and 94a in signal conditioning circuitry 304 may be included as necessary to accommodate a variety of manufacture and types of computers.

Figure 4:
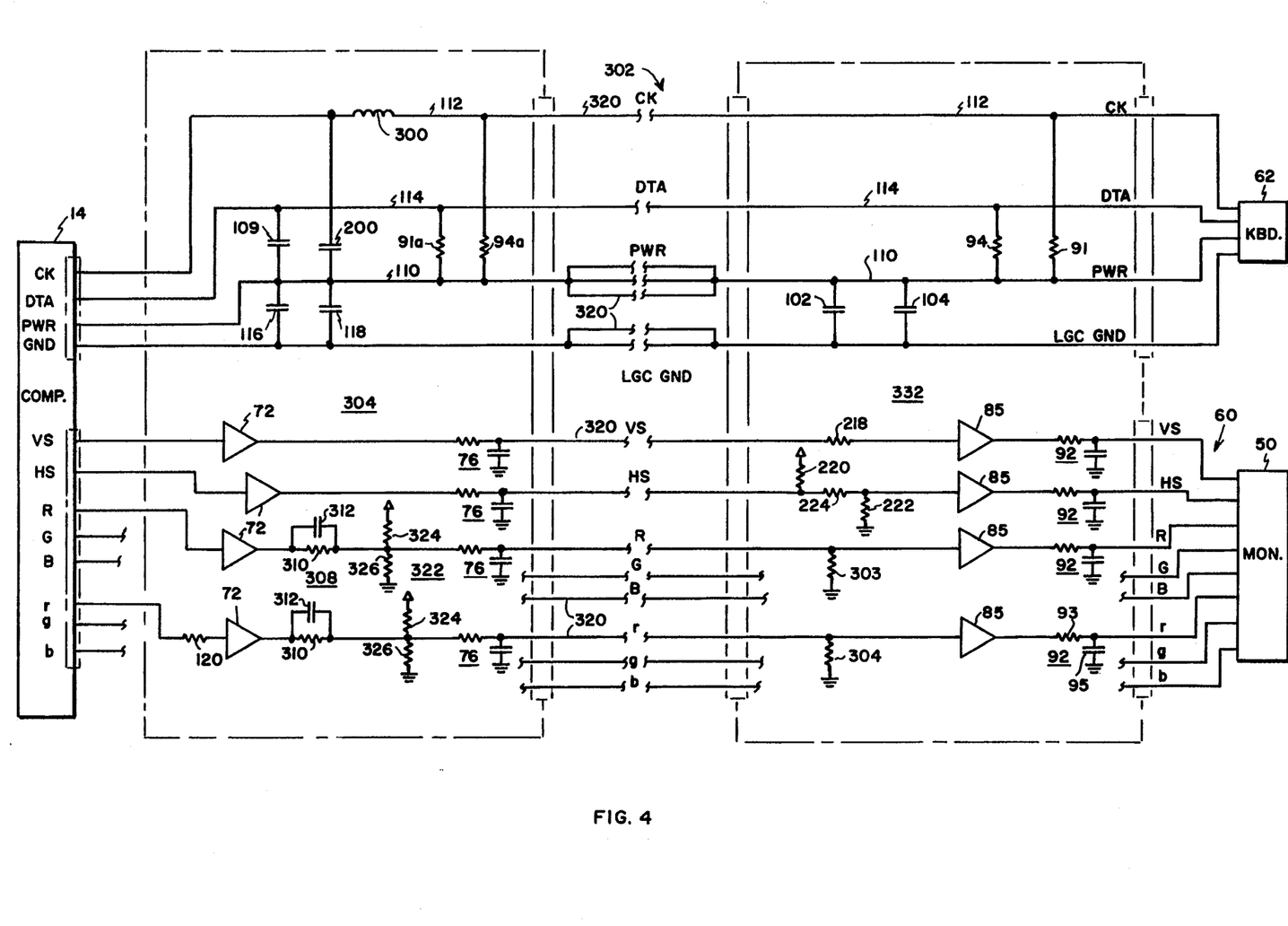
FIG. 4 is a schematic diagram of another embodiment of the present invention capable of extensions of up to 400 feet.

Next, conditioning of video signals in signal conditioning network 304 will be examined. Looking first at sync signals HS and VS, it is seen in FIG. 4 that treatment of the VS and HS signals is unchanged from the embodiments shown in FIGS. 1 and 2 and is functionally the same as described above.

Figure 6:
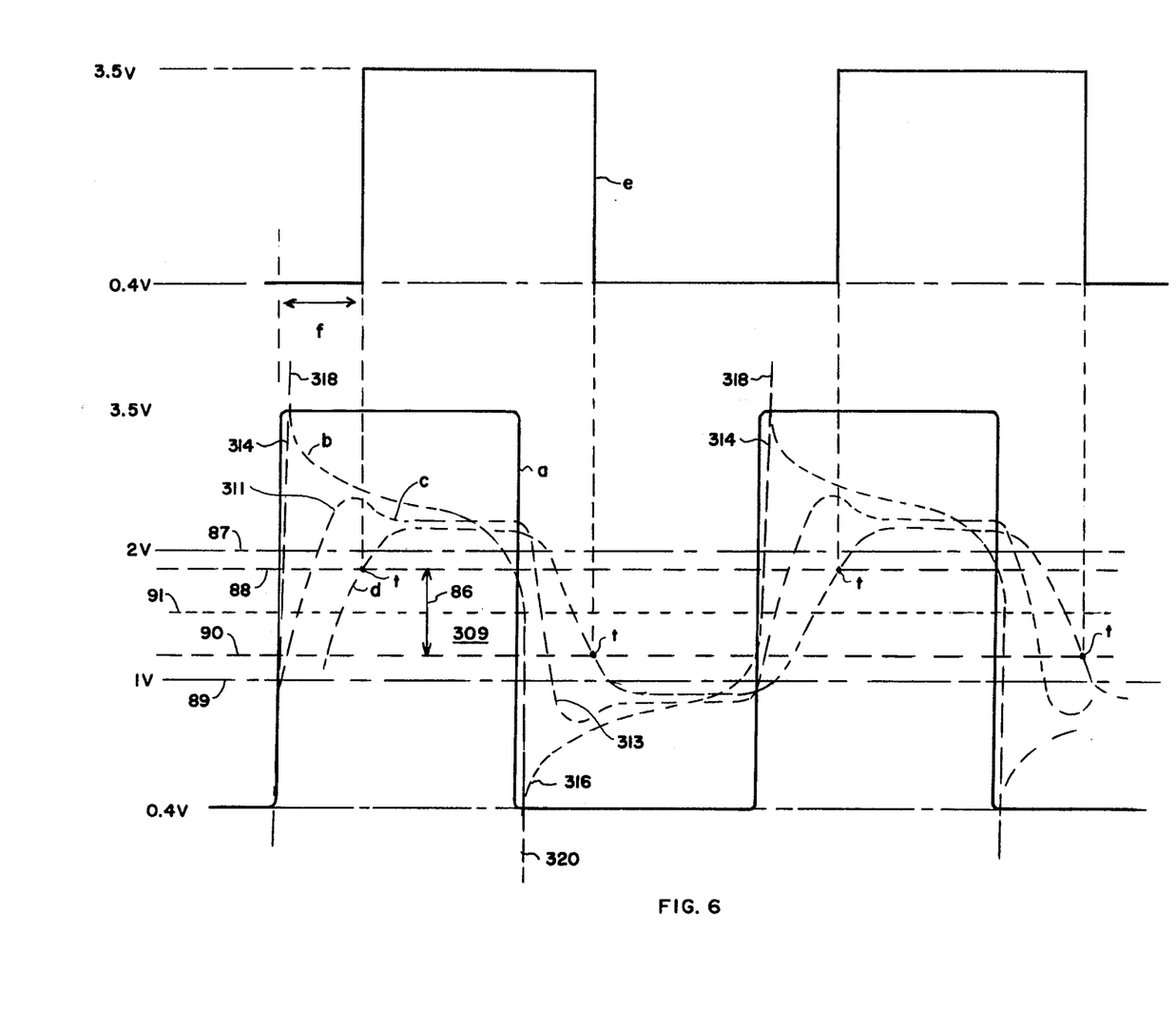
FIG. 6 illustrates waveforms of the present invention showing the manner by which video signals are conditioned and reconstructed by the signal conditioning circuits thereof.

Treatment of the primary R, G, and B signals, designated by upper case letters R, G, and B, with only the R signal path being shown, it being identical to the G and B signal paths, will be undertaken next. These three signals control red, green, and blue color guns of the monitor and are treated in like manner en route from the computer to the monitor and keyboard. Examining the primary red signal route R, and referring to the waveforms of FIG. 6, it is seen that it is simply input to signal conditioning circuitry 304 to TTL buffer amplifiers 72 for reasons described. The output of buffer amplifiers 72, a square wave, digital video signal designated "a" (FIG. 6), and being of a width sufficient to trigger "on" or "off" a single pixel, or picture element, of the display of monitor 50, has an amplitude of from 0.4 V. for a pixel "off" condition to 3.5 V. for a pixel "on" condition and is applied to RC networks 308 consisting of series resistors 310 and capacitors 312 connected in parallel across resistors 310. A typical range of values of resistors 310 is from 100 to 350 ohms, with 220 ohms being preferred, while a typical range of values of capacitors 312 is from 0 to 2500 pF, with 1000 pF being preferred for the primary R and B signals and 470 pF for the secondaries. The values of resistors 310 and capacitors 312 are selected to generally reduce the amplitude of the video signal output from buffer amplifier 72 from a swing of 0.4 V. to 3.5 V. to a 1.5 V. peak-to-peak signal centered at about 1.5 V. and increase amplitude of the rising and falling edges of the signals, as shown for waveform "b". The increased amplitude of the rising and falling edges 314 and 316 is shown in. FIG. 6 as upwardly and downwardly extending voltage spikes 318 and 320, respectively. These spikes are provided by capacitors 312 as functions of the RC rise and fall times of RC networks 308 and act as precompensation to counteract distortion caused by conductors 320 of cable 302. Alternately, RC networks 308 may be replaced by voltage dividers (not shown). Next, the precompensated video signals are passed across biasing networks 322 consisting of resistors 324 of approximately 680 ohms coupled between the signal line and +5 V. and resistors 326 of approximately 360 ohms coupled between the signal line and ground. Resistors 324 and 326 apply a bias voltage of approximately 1.5 volts to the video signals. Additionally, inductors (shown in FIG. 5) may be included in some instances between resistors 324 and 326 and the power lead and ground lead, respectively. These inductors would serve as high frequency dampers for the signal, while passing low frequency components of the signal to +5 V. This damping is, in effect, inversely proportional to frequency, while the inductive damping inherent in the long conductor of cable 302 is proportional to frequency. The values of resistors 324 and 326 and the inductors are selected such that these opposite damping effects between cable 302 and networks 308 tend to cancel each other out, achieving an almost flat frequency response over the up to 400 feet length of cable 302. Additionally, the inductors tend to provide controlled overshoot of rising and falling edges of the signals. RC networks 308 and biasing networks 322 cooperate to provide video signals in the center region 309 of deadband 86 (FIG. 6) of amplifiers 85 in signal conditioning network 322. This results in less signal voltage being required to trigger amplifiers 85 to an "on" or "off" state as described and less signal line voltage applied to video conductors 320 of cable 302, which voltage radiates interfering crosstalk to keyboard and data conductors, CK and DTA, as will be further explained. After being attenuated as described in FIG. 1 by RC networks 76, the primary Red signal (R), as shown by waveform "c" (FIG. 6), being centered about center voltage point 91 and having frequency attenuated rising and falling edges 311 and 313 to reduce noise radiated from cable 302, with the rising and falling edges 314 and 316 provided with slightly higher potentials or spikes 318 and 320 by capacitors 312 to counteract distortion as described, is coupled to a single conductor 320 of cable 302, which may be up to 400 feet in length. This R signal is further amplitude and frequency attenuated by the conductor (waveform "d") but remains substantially a square wave and is received at an opposite end of cable 302 by signal conditioning circuitry 332. Here, the primary Red signal first passes across a termination resistor 303 of approximately 200 ohms, which is connected in parallel with the signal line and ground. This resistor serves to limit overshoot of the signal and provides some current drain from resistor 324 of biasing network 322 to reduce any crosstalk that occurs over the up to 400-foot span of conductor 320. At this point, the discrete digital signals are biased to have a center voltage approximately 1.5 V. above ground potential and have a voltage swing of approximately 1.2 V. This signal, applied to Schmitt-triggered buffer amplifiers 85 which, as described, have a 400–700 mV. deadband 86 (FIG. 6), triggers amplifiers 85 "on" and "off" as indicated by waveform e, the triggering occurring at points "t". Thus, as the transmitted signals on conductors 320 of cable 302 need only swing by slightly less than 0.5 V. peak-to-peak in order to trigger amplifiers 85, radiated noise and the attendant crosstalk generated thereby are reduced. In this manner, amplifiers 85 receive degraded signals which are attenuated by line capacitance and inductance of conductors 320 and reconstruct the signals in network 322 based on the rising and falling edges of waveform "d" crossing upper and lower thresholds 88 and 90 of deadband 86, providing the reconstructed signal. The phase shift "f" may be ignored, as this same phase shift occurs with all the video signals, and is not visible on monitor 50.

To reduce EMI radiation of the signal reconstructed by TTL amplifiers 85, applicants degrade the high frequency rising and falling edges of the signals which are in excess of the dot-clock frequency of monitor 50 by inputting the signals to frequency attenuation networks 92. These networks again reduce the EMI radiation by clipping the high frequency components of the signal as described. Any phase shift caused by attenuation networks 92 (FIG. 1) is cumulative with the same phase shift "f" from attenuation networks 76 of FIG. 1. However, as stated, phase shift errors induced thereby on discrete pixels may be ignored because they cannot be detected when displayed on a monitor.

Treatment of the secondary r, g, and b video signals will be undertaken next. Inasmuch as they are treated the same with respect to each other, slight differences exist between treatment in general between primary and secondary color video signals. Examining first the secondary red (r) video signal, it being representative of the green and blue secondary signal routes, it is input to signal conditioning network 308 (FIG. 4) from computer 14. Thereafter, the secondary red signal is passed through a 100-ohm resistor 120 which, as described for FIG. 1, slightly delays the signal to the following amplifier 72 in order to offset switching of the secondary buffers 72 from the switching of the primary buffers 72, reducing power requirements. Next, the secondary red signal Is input to TTL buffer amplifiers 72 coupled in single-ended configuration for reasons described, prior to passing it to RC networks 308 and 322. Networks 308 and 322 are like networks described for the primary Red signal and used for the same purpose, i.e., to generally reduce the voltage swing of the signal, provide more energy to rising and falling edges for precompensation, and bias the center voltage of the signal to the center of the deadband range of the Schmitt-triggered amplifiers in signal conditioning circuitry 332. Next, the r signal is passed to signal attenuation networks 76, which are identical to those of the primary R, G, and B signals and used for signal attenuation as described to reduce noise. The signal then passes to the up to 400-foot conductor 320 in cable 302. At the KDU end of cable 302, the secondary red signal is terminated by a 360-ohm termination resistor 304 which, as for the same resistors of the primary signal circuits, provides a slight current drain to reduce induced crosstalk superimposed on the signal. The signal is then input to the Schmitt-triggered buffer amplifier 85 which, for example, may be a 74LS244 integrated circuit, which reconstructs and amplifies the signal as described for the primary red signal. After being amplified and reconstructed, the secondary red signal Is passed through RC network 92. Network 92 is used for the same purpose as described for the primary red signal, i.e., EMI reduction and clipping of the high frequency component of the secondary r, g, and b signals. It should be noted, however, that selection of 470 pF capacitance for capacitors 95 is not as critical as is the selection of this capacitance of the same capacitor of the networks used in signal conditioning circuitry 304 due to the generally shorter cable length of cable 60 from monitor 50 connecting the monitor to signal conditioning network 332. As stated, these capacitors may have values that range from 47 to 560 pF.

Figure 5:
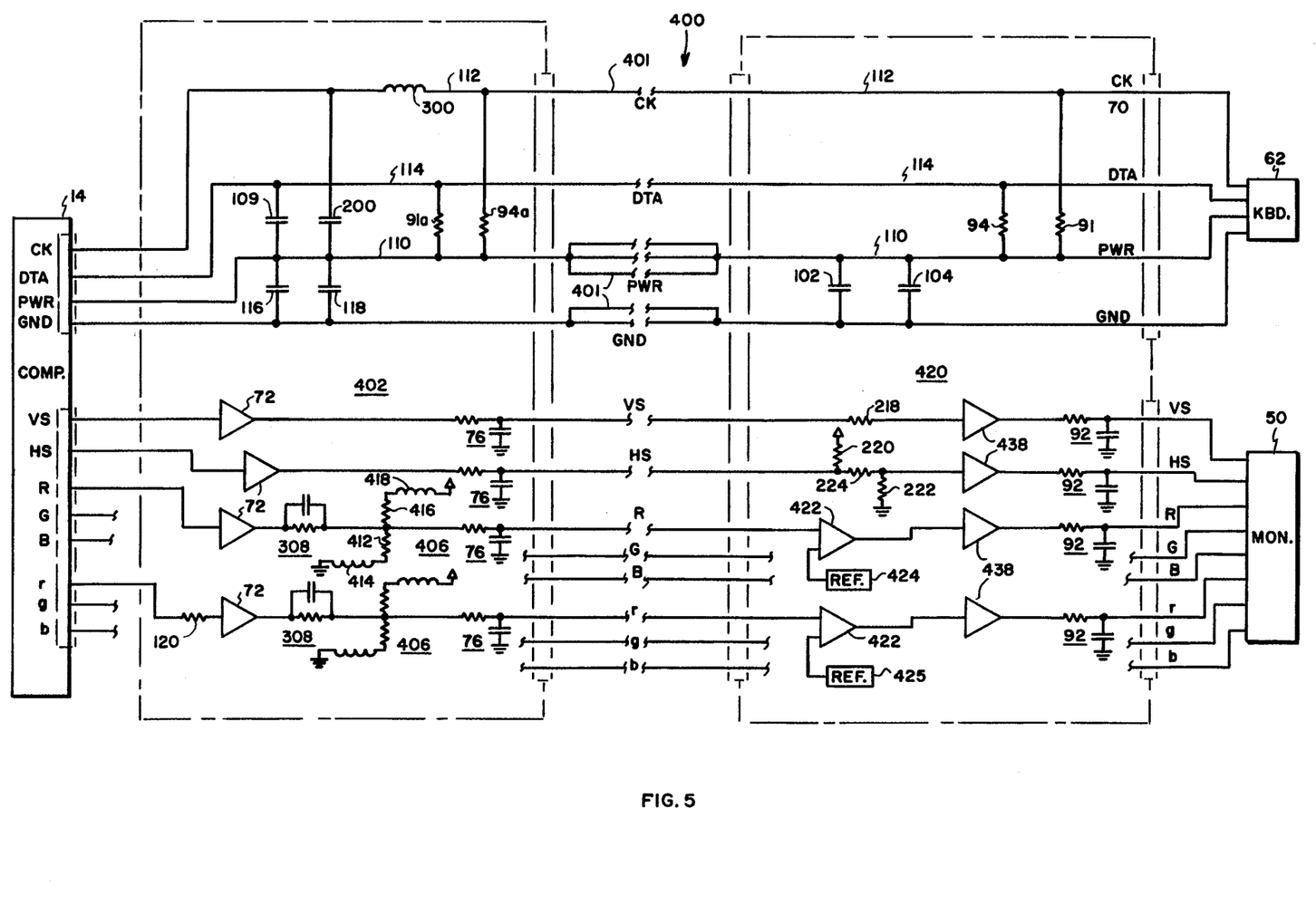
FIG. 5 is a schematic diagram of yet another embodiment of the present invention and which is capable of extensions up to 1,000 feet.

Signal conditioning for the last embodiment, as shown in FIG. 5, will be discussed next. In this embodiment, separation between computer 14 and monitor 50 and keyboard 62 may be extended up to 1,000 feet, with capacitance of a 1,000-foot cable 400 being on the order of 12,000 pFd. As shown in FIG. 5, keyboard circuitry remains as shown and described for the embodiment of FIG. 4, with pull-up resistors 91 and 94 and and 94a being distributed in either conditioning circuitry 402 or 420 as needed. Additionally, conditioning for sync signals HS and VS is also the same as shown and described for the circuitry of FIG. 4.

Conditioning for primary and secondary video signals is similar to that shown in FIG. 4. However, significant differences exist. As in the other embodiments, the primary and secondary video signals are input signal conditioning network 402 to discrete TTL buffer amplifiers 72, with a series resistor 120 in input lines for the secondary signals. The primary and secondary signals are output at TTL signal levels as shown in FIG. 6, waveform "a", from amplifiers 72 to preconditioning networks consisting of RC networks 308 and biasing networks 406. RC networks 308 are constructed and function as described for FIG. 4 to generally reduce the amplitude of the video signals to about 1 V. peak-to-peak and apply more energy to the rising and falling edges 314 and 316 (FIG. 6) as earlier described. Alternately, RC circuit 308 may be replaced by a voltage divider network (not shown). Next, the reduced-in-amplitude signals are applied to LR biasing networks 406, which consist of a resistor 412 in series with an inductor 414, with the resistor coupled to the signal line and the inductor coupled to ground. Another similar LR pair consisting of resistor 416 and inductor 418 is coupled between the signal line and +5 V. Resistor 416 is of a value of about 680 ohms, and resistor 412 is of a value of about 360 ohms. Inductors 414 and 418 are of about 10 microhenries each and alternately may be ferrite beads. Inductors 416 and 418 serve to block the high frequency signals and limit overshoot of the signals as earlier described for the embodiment shown in FIG. 4. Still further, LR networks 406, by virtue of the values selected for resistors 412 and 416, bias the video signal about 1.5 V., for reasons earlier described.

After being preconditioned and biased as described, the video signals are passed to RC networks 76 which limit EMI radiation by frequency attenuating high frequency components of the signal, as shown in waveform "c" (FIG.6). Alternately, these networks may be replaced by ferrite beads (not shown), which act to choke the high frequency components of the signal. After being attenuated, the video signals are applied to discrete conductors 401 of cable 400 up to 1,000 feet in length where, at the opposite end thereof, the signals are received by signal conditioning network 420. Here, treatment of keyboard signals and VS and HS signals is as described for the embodiment of FIG. 4, while a different treatment is required for the video signals.

Figure 7:
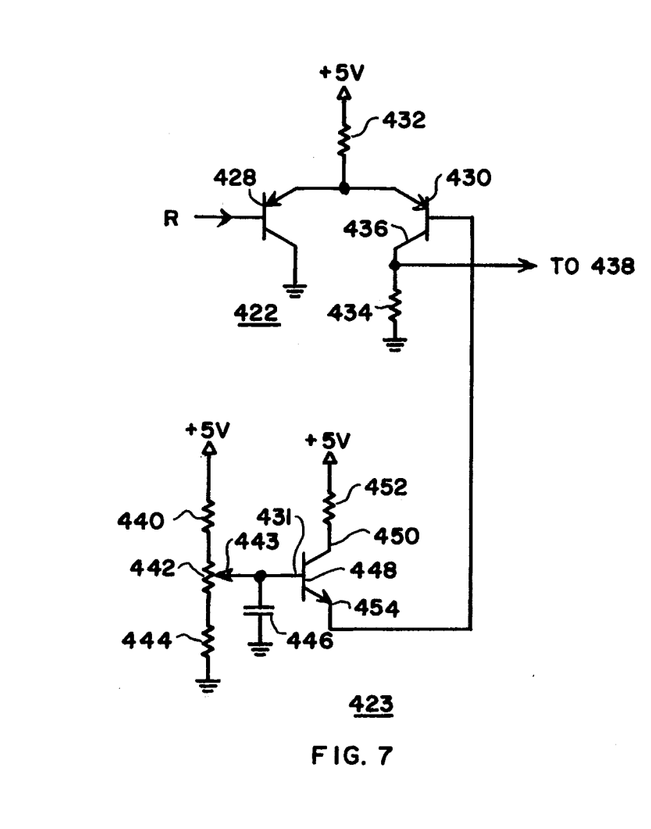
FIG. 7 is a schematic representation showing particulars of construction of one embodiment of the present invention.

This different treatment is necessary because of the longer cable length and resultant greater capacitance and inductance thereof, which amplitude attenuates the video signals to below a 1 V. peak-to-peak amplitude, which in turn will not reliably trigger the Schmitt-triggered amplifiers. It is noted that of the three embodiments described herein, the cable system extending to 1,000 feet causes the least current flow to occur in cable 400 by applying about 1.5 V. of D.C. bias to the cable and about 1 V. peak-to-peak of high frequency video and allowing the conductor to attenuate the video signal to have a signal amplitude of about 0.5 V. when it reaches signal conditioning network 420. Here, applicants utilize a discrete comparator/amplifier circuit 422, which serves as a center point crossing detector and which is coupled to each of the primary and secondary video signals (only one shown for each type signal) from cable 400 in conjunction with a reference voltage source 424 for the primary signals and a second reference voltage source 425 for the secondary signals. Voltage sources 424 and 425 are offset by approximately 100–200 mV., affecting a slight delay in switching between the primary and secondary signals, which reduces power supply requirements. As shown in FIG. 7, comparator circuit 422 is simply a pair of emitter coupled PNP transistors 428 and 430, with a common resistor 432 coupled to +5 V. and the emitter of transistors 428 and 430, which provides bias voltage and limits current. The collectors of transistors 428 and 430 are coupled to ground, with a resistor 434 in series with collector 436 of transistor 430, resistor 434 allowing voltage to build up to a TTL level when transistor 430 is saturated. This TTL level output, about 3.2 V., is taken from collector 436 and applied to a TTL buffer amplifier 438, which in turn passes the signal to an RC network 92, for reasons heretofore described. While a particular circuit for comparators 422 is disclosed, it is noted that other types of comparators, such as conventional operational amplifiers, Darlington paired transistors, resistor bridges, or emitter coupled transistors with a constant current supply, may be utilized. Likewise, a circuit 423 for reference voltage sources 424 and 425 is disclosed in FIG. 7. Here, a series resistor 440 coupled to +5 V. is connected to one side of a potentiometer 442, and another series resistor 444 on the other side of potentiometer 442 is coupled to ground. An adjustable voltage taken from wiper 443 of potentiometer 442, smoothed by a capacitor 446 and applied to the base 431 of transistor 448. Collector 450 of transistor 448 is coupled to +5 V. via current limiting resistor 452. A stable, adjustable voltage of about 2.5 V., which serves to set the threshold at which comparators 422 will switch from a high to low state, or vice versa, is taken from emitter 454 and applied to the input of comparator 422. Alternately, reference voltage sources 424 and 425 may be linear voltage regulators, zener diodes appropriately filtered, or voltage dividers appropriately filtered, or equivalents thereof.

Operation of comparators 422, it being remembered that there is a discrete comparator for each of the primary R, G, and B and secondary r, g, and b video signals and reference sources 424 and 425, these reference sources providing reference voltages for the primary and secondary comparators 422 as described, is to provide a threshold level 91 (FIG. 6) at the reference voltage level such that when the video signal received by conductors 401 applied inputs of comparators 422 rises above the threshold, or center point 91, a "high" is applied to amplifiers 438. When the video signals fall below threshold 91, a "low" is provided to buffers 438. This occurs as the video signal rises above threshold switches transistors 428 "off," and saturates transistors 430, shorting current from resistor 432 to ground and allowing voltage to build up to a TTL "high" level at emitter 438. This applies a "high" to the input to buffer 438. A "low" applied to the base of transistor 428 turns it "on," allowing the current from resistor 432 to flow through transistor 428 to ground, shutting off transistor 430. Thus, the video signals from cable 401 must only have an amplitude sufficient to reliably cross a single threshold 91 in order to provide reconstructed TTL signals to monitor 50.

From the foregoing, it is apparent that applicants have provided circuitry in three embodiments for transmitting TTL signals from a computer to a keyboard and monitor located up to 250, 400, or 1,000 feet distant therefrom, the circuitry being inexpensive and easy to manufacture while providing reliability of operation.

Having described our invention and the manner of its intended use, it is apparent that incidental changes may be resorted to that fairly fall within the scope of the following appended claims, wherein we claim:

1. A communications link for coupling a computer to a remotely located monitor comprising:
   a cable having a plurality of discretely insulated inner conductors and first and second ends;
   one of said conductors at said first end of said cable being couplable and responsive to a vertical synchronization signal from a computer terminal;
   a second one of said conductors at said first end of said cable being couplable and responsive to a horizontal synchronization signal from a computer terminal;
   a first type signal conditioning circuit being couplable and responsive to at least one of a discrete TTL type primary R, G, And B and secondary r, g, and b video signals from a computer terminal, and each said first type signal conditioning circuit including reduction means for reducing amplitude of said signal and further including signal emphasis means for boosting the rising and trailing edges of a video signal and coupling a boosted signal to a discrete one of said conductors at said first end of said cable;
   a plurality of second type signal conditioning circuits, one of each responsive to a TTL video signal of a said conductor at said second end of said cable and including amplification means for raising the level of a video signal to a raised level signal and supplying the raised level signal to a monitor; and
   coupling means for coupling synchronization signals from conductors of said cable at said second end to said monitor.

2. A communications link as set forth in claim 1 wherein said first type signal conditioning circuit comprises a plurality of TTL buffer amplifiers, each amplifier having an input and an output, said input being responsive to a respective one of said video signals from a said terminal, and a said output coupled to said emphasis means and signal reduction means.

3. A communications link as set forth in claim 1 wherein each said second type signal conditioning circuit comprises:
   upper voltage threshold means having an upper voltage threshold responsive to a video signal crossing an upper threshold in a rising direction, for providing an upper portion of a reconstructed one of said video signals; and
   a lower voltage threshold means having a lower voltage threshold responsive to said video signal crossing a lower threshold in a falling direction, for providing a lower portion of a reconstructed one of said video signals.

4. A communications link as set forth in claim 3 wherein there is a hysteresis region between said upper and lower voltage thresholds, and a voltage center point being generally centered between said upper and lower voltage thresholds, and the amplitudes of rising and falling edges of video signals being sufficient to cross said upper and lower voltage thresholds.

5. A communications link as set forth in claim 4 wherein a said first type signal conditioning circuit includes high frequency roll-off means following said emphasis means and said reduction means.

6. A communications link as set forth in claim 1 wherein each said second type signal conditioning circuit further comprises threshold means responsive to a video signal crossing a selected single threshold voltage, for providing rising and falling signals, respectively, with a voltage center point generally centered at said threshold, whereby said video signal is reconstructed.

7. A communications link as set forth in claim 1 wherein there are a plurality of said first type signal conditioning circuits, and each being responsive to a discrete R, G, and B and r, g, and b video signals from a computer terminal, and each video signal from each said first type signal conditioning circuit being coupled to a discrete conductor at a first end of said cable, and said cable having an outer conductive sheath.

8. A communications link as set forth in claim 1 wherein said second type signal conditioning circuit includes signal damping means coupled between said second end of said cable and a said amplification means for damping video signals.

9. A communications link as set forth in claim 1 wherein said emphasis means includes a serially disposed circuit to a video signal comprising a resistance and capacitance in parallel.

10. A communications link as set forth in claim 9 wherein said emphasis means includes inductance positioned across, in parallel, the video signal.

11. A communications link as set forth in claim 1 wherein said second type signal conditioning circuit includes a comparator, one input of which receives a video signal from said second end of said cable, and a second input of which receives a reference signal, an output being produced when a video signal crosses, in value, said reference signal.

12. A communications link for coupling a computer to a distantly located monitor and keyboard, comprising:
   a first signal conditioning circuit coupled to video output terminals of said computer, said terminals conveying horizontal sync signal HS and vertical sync signal VS, primary R, G and B, and secondary r, g, and b video signals, and further coupled to a keyboard clock terminal and a keyboard data terminal conveying keyboard data signals to said computer, said first signal conditioning circuit also coupled to stable potentials including power and ground potentials, said first signal conditioning circuit disposed for conditioning said keyboard signals and providing conditioned said keyboard signals to said computer, and further providing conditioned said VS and HS, conditioned said primary R, G, and B, and conditioned said secondary r, g, and b video signals to said monitor, said first signal conditioning circuit comprising:

a plurality of discrete, TTL amplification means, one of each coupled to said video output terminals for providing TTL level signals HS and VS and TTL level primary and secondary video signals, a plurality of discrete amplitude attenuation means, one of each coupled to one of each said TTL amplification means coupled to said primary and said secondary video signals, for reducing amplitude of said TTL level primary and secondary video signals to a predetermined level, a plurality of discrete biasing means, one of each coupled to one of each said amplitude attenuation means, for biasing a center voltage of the amplitude attenuated primary and secondary video signals to a predetermined potential, a first capacitor coupled between said keyboard clock terminal and a stable potential of said stable potentials for shunting frequencies on said clock terminal significantly higher than a clock pulse frequency to said stable potential, and a second capacitor coupled between said keyboard data terminal and said stable potential for shunting frequencies on said data terminal of a significantly higher frequency than a data frequency to said stable potential;

an extended-in-length cable having a plurality of discrete, insulated conductors coupled at one end to said first signal conditioning circuit and disposed for conveying said keyboard signals and said stable potentials and biased and amplitude attenuated said primary and secondary video signals and said TTL level signals HS and VS; and a second signal conditioning circuit coupled to an opposite end of said conductors of said cable and disposed for reconstructing said video signals and providing further conditioned said video signals to said monitor and receiving said keyboard signals from said keyboard and providing said keyboard signals to conductors of said cable, said second signal conditioning circuit comprising:

a plurality of discrete threshold circuit means responsive to said video signals, one of each coupled to discrete said conductors of said cable conveying said primary and secondary video signals, for reshaping said video signals degraded by said conductors of said cable and providing TTL level, reshaped said video signals to said monitor, a plurality of relatively short conductors coupled at one end to output terminals of said keyboard conveying said keyboard signals and to power terminals of said keyboard, said short conductors coupled at an opposite end to respective said conductors of said cable, for providing said keyboard signals to said conductors of said cable and said stable potentials to said keyboard, a first resistor coupled between a said short conductor conveying said clock signal and a said short conductor conveying stable potential, and a second resistor coupled between a said short conductor conveying said data signal and a said short conductor conveying said stable potential, said first and second resistors disposed for decreasing rise times of said clock and data signals, whereby said keyboard signals are applied to said conductors of said cable via said short conductors of said second signal conditioning circuitry, said keyboard signals being received and conditioned by said first signal conditioning circuitry and thereafter provided to said computer, while said video signals and said stable potentials are provided by said computer to said first signal conditioning circuitry, conditioned therein, and applied to said discrete conductors of said cable to said second signal conditioning circuitry where said video signals are reshaped and provided to said monitor, and said potentials are provided to said keyboard.

13. A communications link as set forth in claim 12 wherein each said amplitude attenuation means comprises a resistor in series with the TTL level primary and secondary video signals and a capacitor in parallel across said resistor, said capacitor having a capacitance selected to provide said increased voltage levels in said rising and falling edge, said amplitude attenuation means for reducing amplitude of said primary and secondary signals from a TTL voltage level to approximately 1.5 V. peak-to-peak.

14. A communications link as set forth in claim 13 wherein each said biasing means comprises a pair of resistors each having one end coupled to one of each said amplitude attenuation means, with one of said pair of resistors having an opposite end coupled to ground, and the other of said pair of said resistors having an opposite end coupled to +5 V., with resistance of said pair of resistors selected to bias a center point of said amplitude attenuated primary and secondary signals to approximately 1.5 V. above ground potential.

15. A communications link as set forth in claim 14 wherein each said biasing means includes first and second inductors, one inductor coupled in series with one of said resistors, each of said resistors having one end coupled to one of each said amplitude attentuation means, each of said resistors and inductors having a value selected to bias a center point of said amplitude attenuated signals between 1 and 2 volts.

16. A communications link as set forth in claim 12 wherein said threshold means each comprises a Schmitt-triggered amplifier having a hysteresis deadband with upper and lower thresholds between 1 and 2 volts above ground potential, and said predetermined center voltage is at approximately 1.5 V. above ground potential, whereby, as said video signals cross said upper threshold in an positive-going direction, said Schmitt-triggered amplifier provides a TTL logical high signal, and as said video signals cross said lower threshold in a negative-going direction, said Schmitt-triggered amplifier provides a TTL logical low signal.

17. A communications link as set forth in claim 12 wherein said threshold means comprises a single voltage threshold such that when said video signals cross said voltage threshold in a positive-going direction, said threshold means provides a TTL level logical high, and when the video signals cross said voltage threshold in a negative-going direction, said threshold means provide a TTL level logical low for reconstructing attenuated said primary and secondary video signals received from said cable.

18. A communications link as set forth in claim 17 wherein said threshold means comprises a center point crossing detector.

19. A communications link for coupling a computer to a distantly located monitor and keyboard, comprising:
a first signal conditioning circuit coupled to TTL video output terminals of a computer conveying at least TTL levels primary R, G, and B, and secondary r, g, and b video signals, and further connected to keyboard input terminals of a computer conveying keyboard signals including clock CK and data DTA signals, and further coupled to at least one stable power potential including keyboard power and a reference potential, said first signal conditioning circuit comprising:
a plurality of discrete TTL buffer amplifiers each having an input and an output, said input of one of each said buffer amplifiers responsive to one of each of said primary and secondary video signals,
a plurality of discrete recompensating circuits, one of each responsive to one of each said buffer amplifiers, and each further comprising:
signal reduction means responsive to a discrete video signal of said video signals for reducing signal amplitude of said video signal to a predetermined level,
means responsive to said signal reduction means for increasing amplitude of rising and falling edges of a reduced said video signal, and
biasing means responsive to said means for increasing amplitude for biasing a center point of said video signal to a selected potential,
a filter coupled between each of said keyboard input terminals and at least one of said stable potentials, and responsive to frequencies greater than frequencies of said CK and said DTA signals;
an extended cable having a plurality of discretely insulated conductors coupled at one end to said first signal conditioning circuit; and
a second signal conditioning circuit coupled to an opposite end of said conductors and to a keyboard and monitor, and comprising:
a plurality of TTL reconstruction circuits, one of each responsive to one of each said video signals for reconstructing said video signals to original TTL signal levels and providing reconstructed said video signals to a monitor, and receiving said keyboard CK and DTA signals from a keyboard,
whereby said video signals are shaped in said first signal conditioning circuit to counter signal distortion and degradation effected by said cable, are applied to said cable, and are reconstructed in said second signal conditioning circuit prior to being provided to a monitor.

20. A communications link as set forth in claim 19 wherein each of said reconstruction circuits comprises:
upper voltage threshold means having an upper threshold and responsive to one of said video signals crossing said upper threshold in a rising direction, for providing a rising, regenerated one of said video signals;
lower voltage threshold means having a lower threshold and responsive to a one of said video signals crossing said lower threshold in a falling direction, for providing a falling, regenerated one of said video signals; and
a hysteresis region between said upper and lower thresholds, with said center point being generally centered in said hysteresis region and said predetermined level being sufficient to exceed said upper and lower thresholds, whereby said video signals are reconstructed.

21. A communications link as set forth in claim 19 wherein said reconstruction circuits each further comprises a single threshold means having a single threshold responsive to one of said primary and secondary video signals crossing said single threshold in rising and falling directions, for providing a reconstructed rising and falling video signal, with said center point generally centered at said threshold, whereby a one of said video signals is reconstructed.

22. A communications link as set forth in claim 19 comprising a plurality of termination means, one of each coupled between said opposite end of a respective one of said conductors and one of each said reconstruction circuits, for terminating said video signals in said second signal conditioning circuit.

23. A communications link as set forth in claim 19 comprising:
a plurality of first frequency attentuation circuits, one of each coupled between one of each said precompensations circuits and a respective one of said conductors of said cable; and
a plurality of second frequency attenuation circuits, one of each coupled between one of each said reconstruction circuits and a monitor, said first and second frequency attenuation circuits each including a series resistor, and a following capacitor coupled between one end of said resistor and said reference potential.

24. A communications link for coupling a computer to a distantly located monitor comprising:
an extended-in-length cable having a plurality of discretely insulated conductors encased by an outer shield, and each said conductor having an input at one end and an output at an opposite end;
a plurality of video precompensating circuits, one of each having an output coupled to said input of one of each said conductors, and a signal each of said precompensating circuits comprising:
input circuit means for receiving from a computer a discrete video signal and providing a discrete said video signal varying in value between certain discrete signal levels as an output,
damping means responsive to the output of said input circuit means for damping the video signal present at the output of said input circuit means, and
signal reduction means for receiving said video signal through said damping means and providing an output to said input of one of said conductors of said cable with reduced induction into other conductors of said cable; and
a plurality of discrete signal reconstruction means each having an input coupled to a said output of a respective one of said conductors and each said signal reconstruction means comprising at least one threshold means responsive to a said output of said conductors, for reconstructing each said video signal and providing each reconstructed said video signal to a monitor.

25. A communications link as set forth in claim 24 wherein said input circuit means includes means for reducing a voltage swing of said video signal, said reduction being greater at lower frequencies than at higher frequencies.

26. A communications link as set forth in claim 25 wherein said damping means includes resistance and inductance.

* * * * *